United States Patent [19]
Moore

[11] Patent Number: 5,903,367
[45] Date of Patent: May 11, 1999

[54] APPARATUS AND METHOD FOR FAULT-TOLERANT DATA TRANSPORT ON A FIBER OPTIC OVERHEAD CHANNEL

[75] Inventor: Edmund Moore, Oakhurst, Calif.

[73] Assignee: Dantel, Inc., Fresno, Calif.

[21] Appl. No.: 09/044,377

[22] Filed: Mar. 18, 1998

Related U.S. Application Data

[63] Continuation of application No. 08/884,706, Jun. 30, 1997, abandoned.

[51] Int. Cl.$^6$ .................................................. H04B 10/08
[52] U.S. Cl. ............................ 359/110; 359/117; 359/173
[58] Field of Search ........................... 359/110, 117–119, 359/152, 167, 173, 179

[56] References Cited

U.S. PATENT DOCUMENTS 5,229,875   7/1993   Glista ...................................... 359/110

Primary Examiner—Kinfe-Michael Negash
Attorney, Agent, or Firm—William S. Galliani; Pennie & Edmonds LLP

[57] ABSTRACT

A fiber optic network includes a fiber optic transmission channel with a first path and a second path. A set of fault-tolerant remote stations are connected to the fiber optic transmission channel, each of the fault-tolerant remote stations is configured to send and receive fiber optic overhead channel data on both the first path and the second path. A fault-tolerant master station connected to the fiber optic transmission channel includes a switch network and a logic network. The logic network generates first switch command signals to force the switch network into a standard configuration which results in the transmitting and receiving of fiber optic overhead channel data on the fiber optic transmission channel during normal operating conditions. The logic network is configured to assess the fiber optic overhead channel data to identify a fault on the fiber optic transmission channel and produce, in response to the fault, second switch command signals to force the switch network to assume a selected fault configuration such that the switch network continues to transmit and receive fiber optic overhead channel data from the fiber optic transmission channel during the fault.

20 Claims, 10 Drawing Sheets

APPARATUS AND METHOD FOR FAULT-TOLERANT DATA TRANSPORT ON A FIBER OPTIC OVERHEAD CHANNEL

This application is a continuation of application Ser. No. 08/884,706, filed Jun. 30, 1997 now abandoned.

BRIEF DESCRIPTION OF THE INVENTION

This invention relates generally to data transport on fiber optic networks. More particularly, this invention relates to a technique of providing fault-tolerant data transport on a fiber optic overhead channel of a fiber optic transmission channel.

BACKGROUND OF THE INVENTION

Fiber optic networks are known in the art. Fiber optic networks include a set of stations connected to a fiber optic transmission channel. A station typically includes a transmitter and receiver. A transmitter converts electrical pulses to optical pulses, which are applied to the fiber optic transmission channel. A receiver converts the optical pulses back to electrical pulses, which are then processed by another electronic device, such as a computer.

A set of combined optical pulses forms a transport packet. When a station connected to the fiber optic transmission channel has data to send to another station, it adds the address of the receiving station to the data to form a transport packet. The sending station then reads transport packets that are passing on the fiber optic transmission channel. If an empty transport packet is found, the sending station loads its address and data into the transport packet. Intermediate stations push the transport packet through the fiber optic transmission channel. If a station recognizes its address in a passing transport packet, it copies the data and adjusts the header associated with the address to indicate that the data was received. When the transport packet returns to the sending station, the sending station recognizes that the transport packet has been received at its destination and therefore converts the transport package to an empty transport package that can be used once again.

Double-ring fiber optic networks are used for increased reliability. In these networks, each station has two inputs and two outputs connected to two paths that operate in opposite directions. A double-ring optical network can bypass defective stations and send transport packets around a fiber break.

SONET/SDH (Synchronous Optical NETwork/Synchronous Digital Hierarchy) is a communication standard used on double-ring fiber optic networks. The standard defines a number of basic transmission rates within SDH. The first of these is 155 Mbps, normally referred to as STM-1 (Synchronous Transport Module, level 1). SONET, on the other hand starts at a lower bit rate building block, STS-1 (Synchronous Transport Signal, level 1) at 51.84 Mbs. Higher line rates are integer multiples of these base rates.

SDH defines a data structure called a container. A container is a set of data. A path overhead envelope is attached to the container to form a virtual container. The path overhead envelope provides an address, a framing pulse, a check sum, error control, and other functions associated with the data.

FIG. 1 illustrates a virtual container 18A comprising a container 20A and a path overhead envelope 22A. As shown in FIG. 1, a number of virtual containers 18A, 18B, and 18C may be loaded into a payload envelope 24. Different combinations of virtual containers 18 can be used to fill up the payload envelope 24. For example, the payload envelope 24 may be an 87 byte by 9 byte data structure, which can be filled in a variety of ways. The process of loading containers 20 and attaching path overhead 22 is repeated at several levels, resulting in the "nesting" of smaller virtual containers 18 within larger ones. This process is repeated until the large size virtual container is filled, this is then loaded into the payload 24.

When the payload area 24 is full, additional control information is added to the frame to form the transport overhead envelope or fiber optic overhead channel 26. The fiber optic overhead channel 26 remains with the payload 24 as it traverses the fiber optic transmission channel between stations. Its purpose is to provide communication channels, user channels, protection switching, section performance, frame alignment, and other system functions.

The payload envelope 24 constitutes the bulk of the information that is transported over a fiber optic transmission channel. For example, the payload envelope 24 typically constitutes over approximately 95% of a transport packet's bandwidth, while the fiber optic overhead channel 26 constitutes less than approximately 5% of the transport packet's bandwidth.

Since the bulk of the information that is passed over a fiber optic transmission channel is in the payload envelope, most technology related to fiber optic transmission channels is directed toward the payload envelope. Accordingly, it would be highly desirable to use the fiber optic overhead channel in a more useful manner. In particular, it would be highly desirable to use the fiber optic overhead channel for fault-tolerant data transport. This would allow for a private data network that does not impact the revenue-bearing payload envelope.

SUMMARY OF THE INVENTION

A fiber optic network includes a fiber optic transmission channel with a first path and a second path. A set of fault-tolerant remote stations are connected to the fiber optic transmission channel, each of the fault-tolerant remote stations is configured to send and receive fiber optic overhead channel data on both the first path and the second path. A fault-tolerant master station connected to the fiber optic transmission channel includes a switch network and a logic network. The logic network generates first switch command signals to force the switch network into a standard configuration which results in the transmitting and receiving of fiber optic overhead channel data on the fiber optic transmission channel during normal operating conditions. The logic network is configured to assess the fiber optic overhead channel data to identify a fault on the fiber optic transmission channel and produce, in response to the fault, second switch command signals to force the switch network to assume a selected fault configuration such that the switch network continues to transmit and receive fiber optic overhead channel data from the fiber optic transmission channel during the fault.

The fiber optic overhead channel may include private network data. Thus, the invention allows the fiber ring overhead channel to be used in a more useful manner. In particular, the fiber ring overhead channel can be used as a private data network that does not impact the revenue-bearing payload envelope. Moreover, the identification of faults and the reconfiguration of the switch network allows for fault-tolerant data transport.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
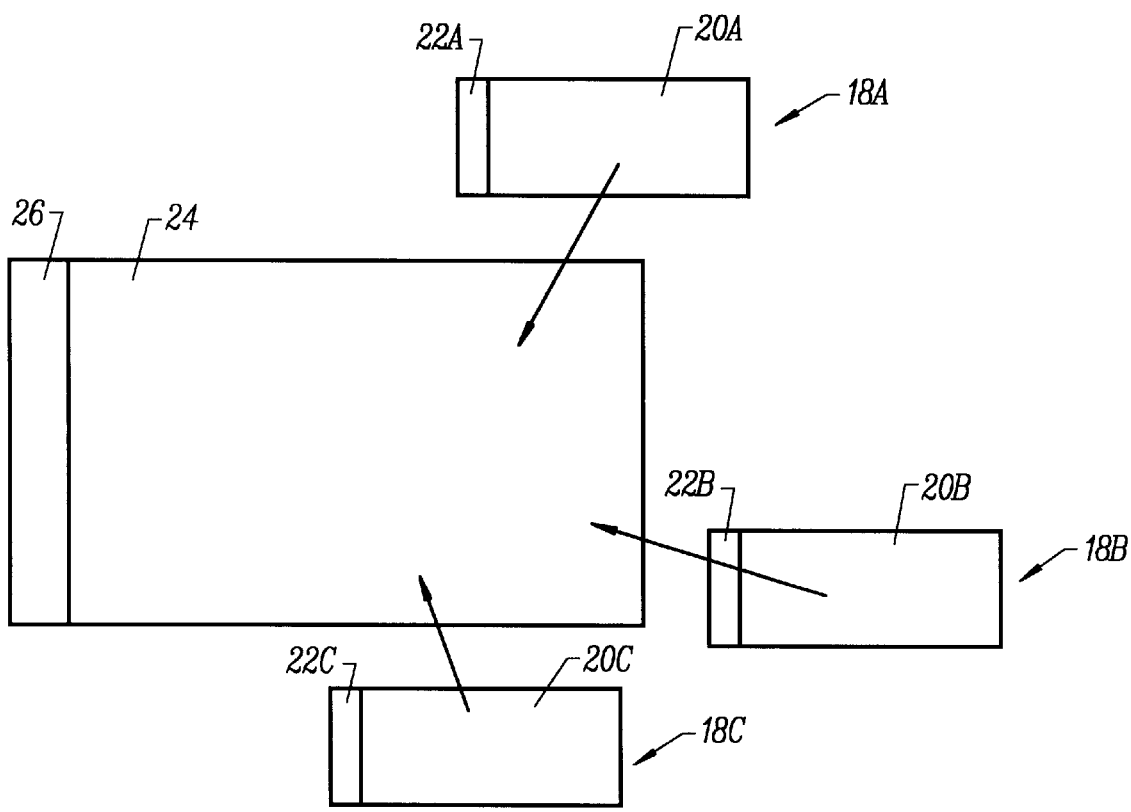
FIG. 1 illustrates a prior art fiber optic transport packet in the form of a payload envelope and fiber optic overhead channel.
Figure 2:
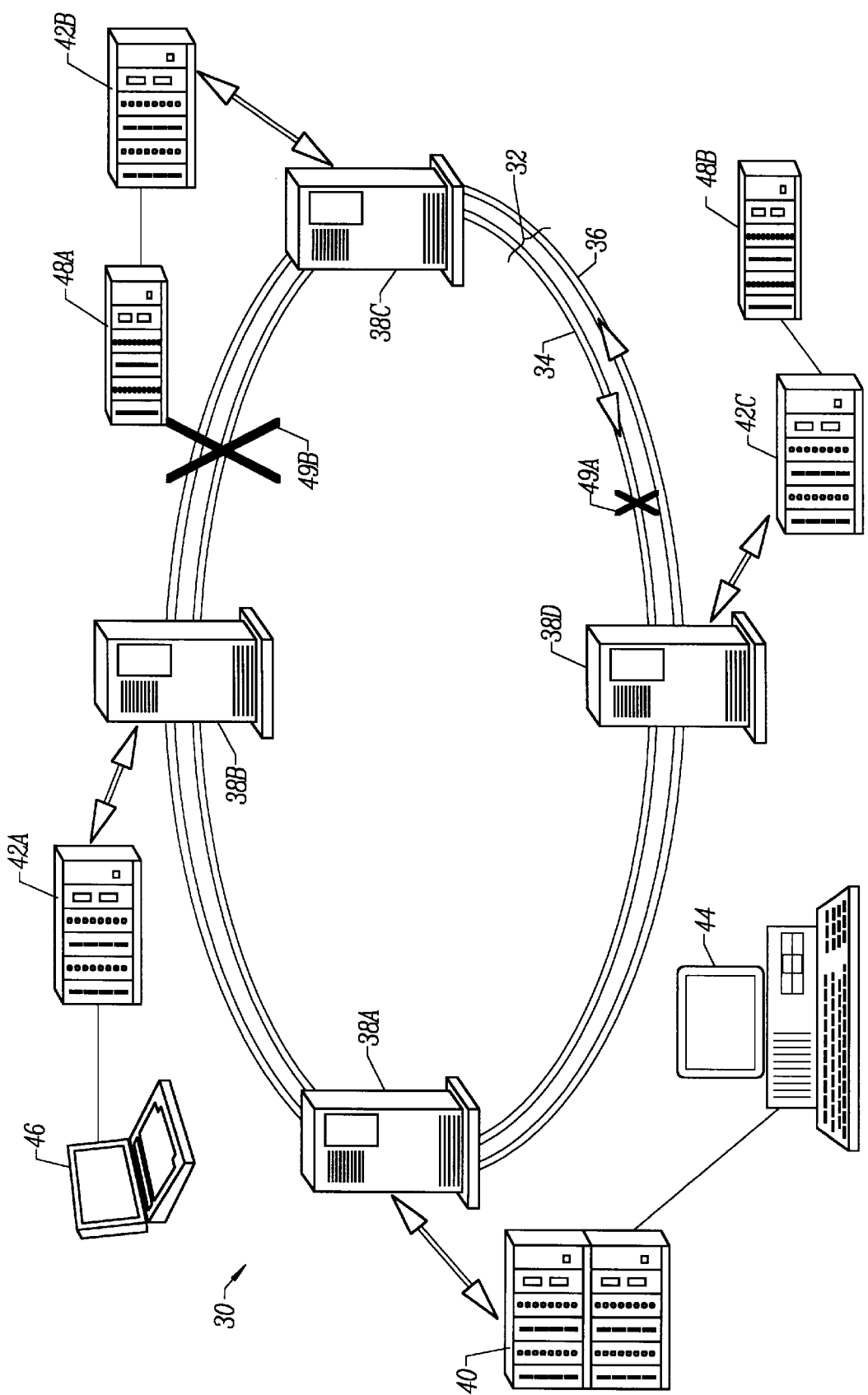
FIG. 2 illustrates a fiber optic network constructed in accordance with an embodiment of the invention.

FIG. 2 illustrates a fault-tolerant fiber optic network 30 in accordance with an embodiment of the invention. The network 30 includes a fiber optic transmission channel 32 with a first fiber optic path 34 and a second fiber optic path 36. A set of fiber optic interface circuits 38A–38D are attached to the fiber optic transmission channel 32. The FT2000 OW fiber optic interface circuit sold by AT&T can be used as the fiber optic interface circuit 38.

Each fiber optic interface circuit 38 operates in a known manner to convert electrical signals into light signals for transport on the fiber optic transmission channel 32 and to convert light signals from the fiber optic transmission channel 32 into electrical signals. Each fiber optic interface circuit 38 examines transport packets on the fiber optic transmission channel 32 to identify transport packets addressed to it. A transport packet addressed to a specific fiber optic interface circuit 38 is processed in a conventional manner. One of the processing operations performed is to divide the transport packet into its payload envelope 24 and fiber optic overhead channel 26.

The present invention is directed solely toward the processing of the fiber optic overhead channel 26. Thus, the invention can be used with known equipment and does not have to otherwise disrupt the processing of the payload envelope 24. As previously indicated, the payload envelope 24 constitutes the vast majority of the data bandwidth on a fiber optic transmission channel 32. The payload envelope 24 is typically assigned to clients of an entity that operates a fiber optic transmission channel 32. The clients pay a fee for this access, thus the payload envelope is referred to as a revenue-bearing data path. The operator of a fiber optic transmission channel 32 wants to maximize the revenue-bearing data path. Thus, the payload envelope is devoted to paying customers. However, the operator of a fiber optic transmission channel 32 may want to use a portion of the bandwidth of the channel 32 for its own private network data communications. The present invention is directed toward using the overhead channel 26 for private network data communications. More particularly, the invention is related toward a technique of providing fault-tolerant private network data communications on the fiber optic overhead channel.

FIG. 2 illustrates a fault-tolerant master station 40 connected to the fiber optic interface circuit 38. The fiber optic interface circuit 38 passes the fiber optic overhead channel data to the fault-tolerant master station 40. The fault-tolerant master station 40 divides the data into various channels. The different channels of data can then be passed to a computer 44 or other computation device. The fault-tolerant master station 40 assesses the overhead channel data to determine whether a fault has occurred on the fiber optic transmission channel 32. If so, it alters the way that it receives and sends data on the channel 32, as described below.

FIG. 2 also illustrates a set of fault-tolerant remote stations 42A–42C. Each fault-tolerant remote station 42 is essentially a repeater station, which sends and receives transport packets on each path 34, 36. FIG. 2 illustrates that a computer 46 may be attached to a fault-tolerant remote station 42A. The computer 46 can be used to receive private network data forming a part of the fiber optic overhead channel data. For example, computer 44 may download private network data to the fault-tolerant master station 40, which causes the private network data to be loaded into the fiber optic overhead channel data which is applied to the fiber optic transmission channel 32. The fiber optic interface circuit 38B then retrieves the fiber optic overhead channel data and passes it to the fault-tolerant remote station 42A, which passes it to the computer 46 for processing in a standard manner. In this way, the fiber optic overhead channel is used for private network communications. Observe that these communications do not impact upon the payload envelope. Instead, these communications exploit otherwise unused bandwidth available on the fiber optic transmission channel. Further, since this bandwidth is generally unformatted, it can be readily configured for private network use.

FIG. 2 also illustrates that alarm equipment 48A may be connected to a faulttolerant remote station 42B. The alarm equipment 48A may be used to interpret alarm signals in the fiber optic transmission channel.

FIG. 2 illustrates a fault 49A on the fiber optic transmission channel 32. The fault 49A disrupts communications on the first path 34. As described below, the fault-tolerant master station 40 responds to such a fault by reconfiguring its switch network so that it continues to receive and send the fiber optic overhead channel data, despite the fault. Similarly, if a fault 49B disrupts both paths 34 and 36, the fault-tolerant master station 40 responds by reconfiguring its switch network so that it continues to receive and send the fiber optic overhead channel data.

Thus, the invention provides a fault-tolerant scheme for transporting data. Further, this fault-tolerant scheme for transporting data is used for private network communications over an otherwise un-used fiber optic overhead channel. Thus, the operator of a fiber optic transmission channel 32 can establish fault-tolerant private network communications without effecting the revenue-bearing payload envelope.

Figure 3:
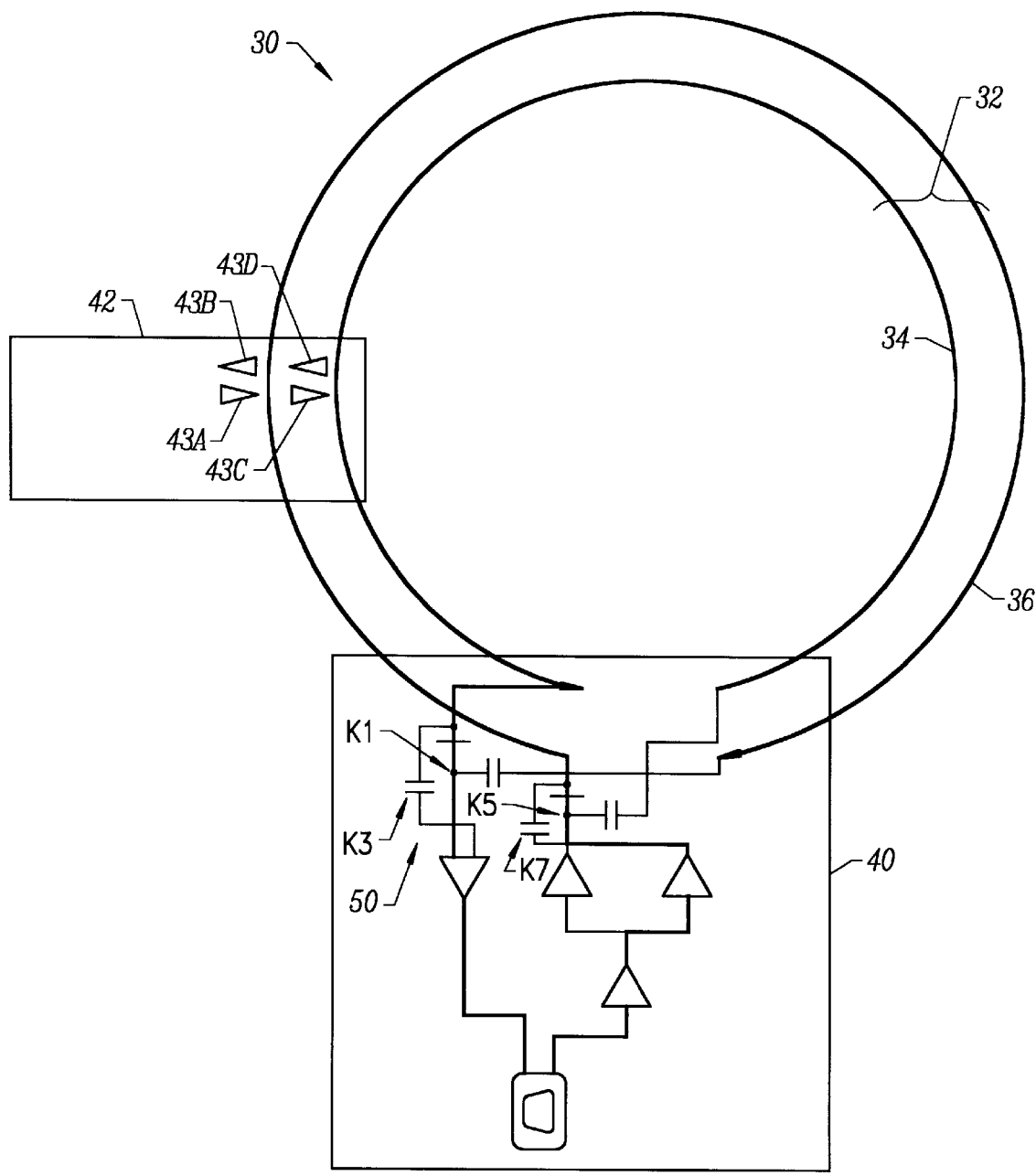
FIG. 3 is a simplified illustration of an embodiment of the fiber optic network of the invention under normal operating conditions.

FIG. 3 is a simplified illustration of the fault-tolerant fiber optic network 30. The figure illustrates the fiber optic transmission channel 32 including a first path 34 and a second path 36. The figure also illustrates a fault-tolerant master station 40 and a fault-tolerant remote station 42. The fault-tolerant master station 40 includes a switch network 50 to alter the manner in which signals are sent and received on the fiber optic transmission channel 32, depending upon the operative condition of the fiber optic transmission channel 32.

In the figures, double lines (∥) denote an open switch, while a single line (∣) denotes a closed switch. Thus, in FIG. 3, switch K1 is closed, switch K3 is open, switch K5 is closed, and switch K7 is open. In this configuration, the fault-tolerant master station 40 transmits fiber optic overhead channel data on path 36 and receives fiber optic overhead channel data on path 34, as shown with bold lines. Each fault-tolerant remote station 42 on the fiber optic transmission channel 32 transmits and receives fiber optic overhead channel data on each path 34, 36, as shown with the arrows 43A–43D.

Figure 4:
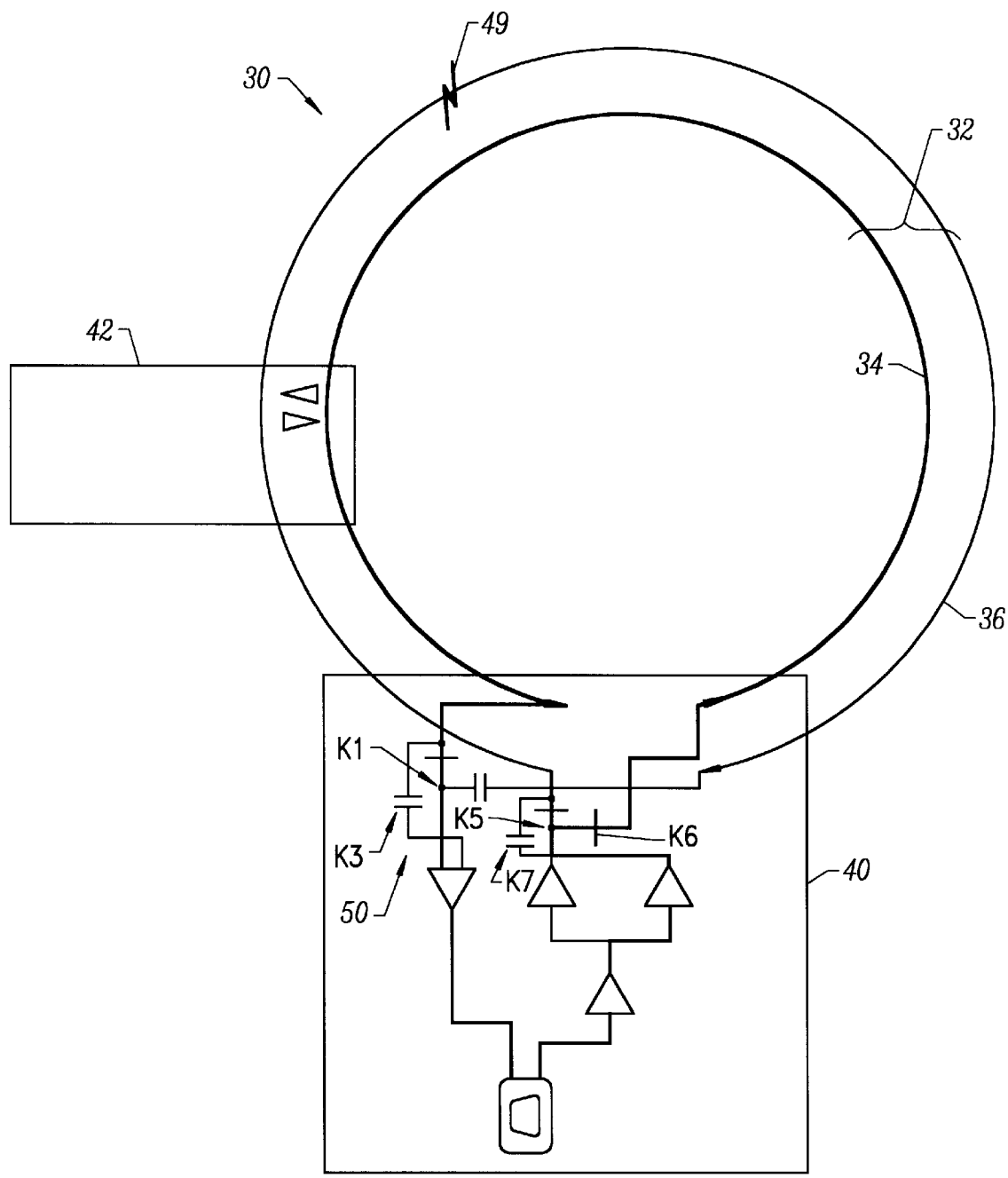
FIG. 4 is a simplified illustration of an embodiment of the fiber optic network of the invention when a first path has failed.

FIG. 4 illustrates the fault-tolerant fiber optic network 30 with a fault 49 on the path 36. As described below, the fault-tolerant master station 40 will recognize an alarm signal in the fiber optic overhead channel data. In response to the signal, it will alter the switch network from a standard configuration, as described in reference to FIG. 3, to a fault configuration. In particular, switch K5 is opened and switch K6 is closed. As a result, fiber optic overhead channel data is sent on path 34, and is also received from path 34, as shown with the bold lines in FIG. 4.

Figure 5:
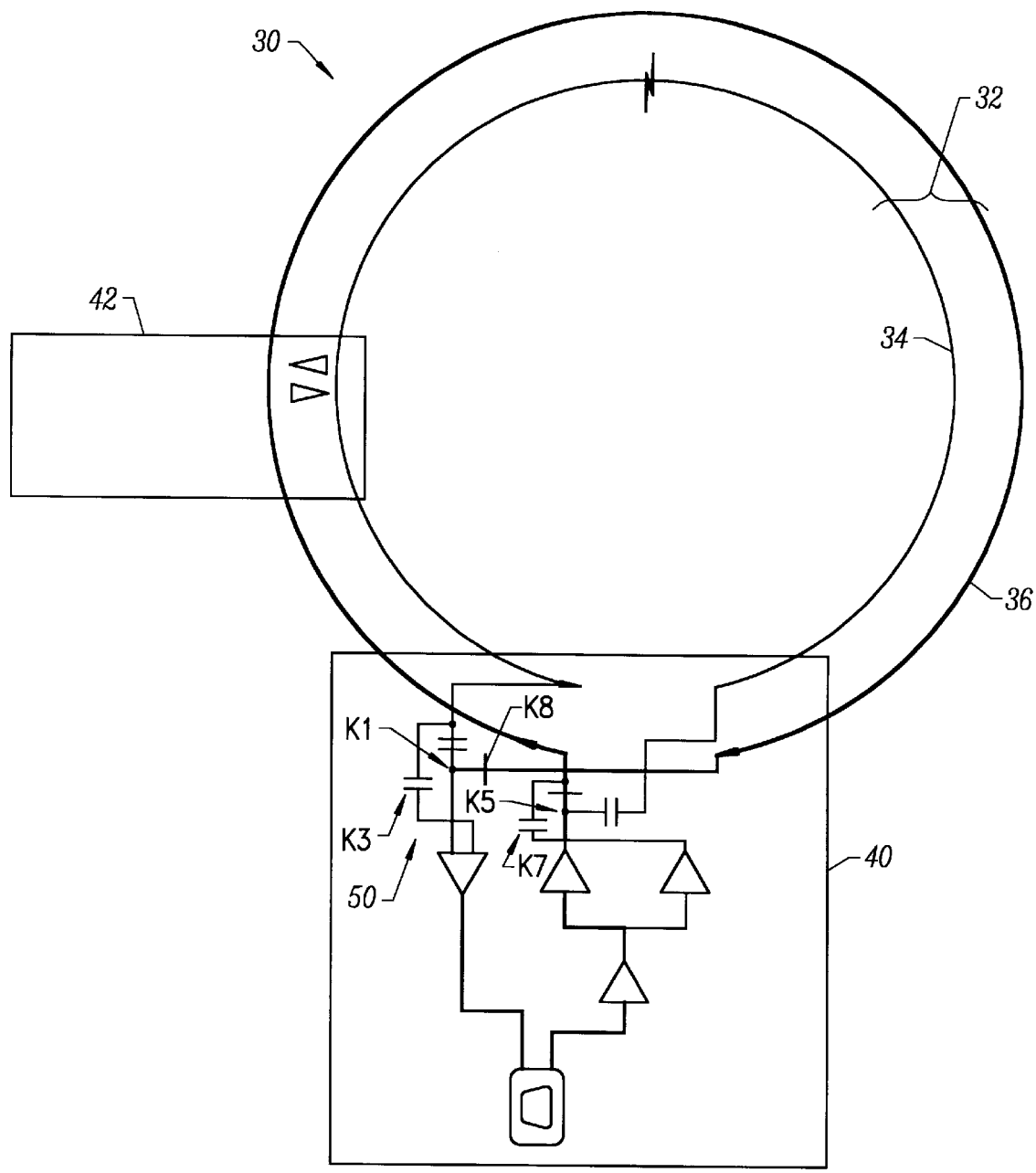
FIG. 5 is a simplified illustration of an embodiment of the fiber ring network of the invention when a second path has failed.

FIG. 5 illustrates the fault-tolerant fiber optic network 30 with a fault 49 on the path 34. The fault-tolerant master station 40 will recognize an alarm signal in the fiber optic overhead channel data. In response to the signal, it will alter the switch network from a standard configuration, as described in reference to FIG. 3, to a fault configuration. In particular, switch K1 is opened and switch K8 is closed. As a result, fiber optic overhead channel data is sent on path 36, and is also received from path 36, as shown with the bold lines in FIG. 5.

Figure 6:
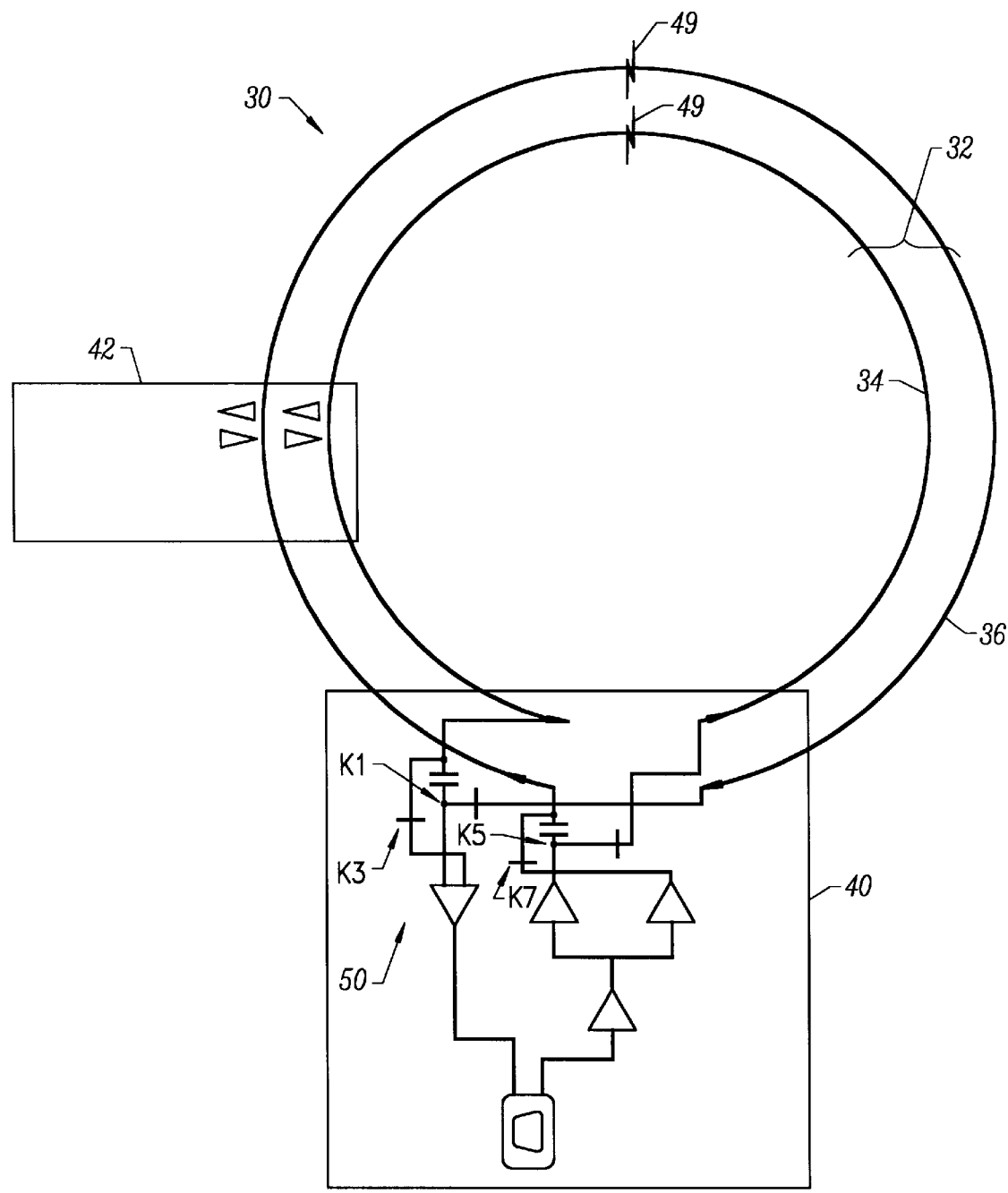
FIG. 6 is a simplified illustration of an embodiment of the fiber ring network of the invention when both paths have failed.

FIG. 6 illustrates the fault-tolerant fiber optic network 30 with a fault 49 on both paths 34 and 36. The fault-tolerant master station 40 recognizes alarm signals in the fiber optic overhead channel data. In response to them, it alters the switch network to another fault configuration. In particular, switch K3 is closed to allow data to be received from one-half of the path 34, and switch K8 is closed to allow data to be received from one-half of the path 36. In sum, data is received from the entire transmission channel 32. Switches K7 and K10 are closed so that data can be transmitted to the entire transmission channel 32. In particular, closing switch K10 allows data to be transmitted on the path 34, while closing switch K7 allows data to be transmitted on the path 36.

A switch network 50 for use with the fault-tolerant master station 40 has now been described. In view of this description, the fault-tolerant handling of fiber optic overhead channel data can be appreciated. Attention presently turns to a more particular description of a fault-tolerant master station 40 and fault-tolerant remote station 42 in accordance with the invention.

Figure 7:
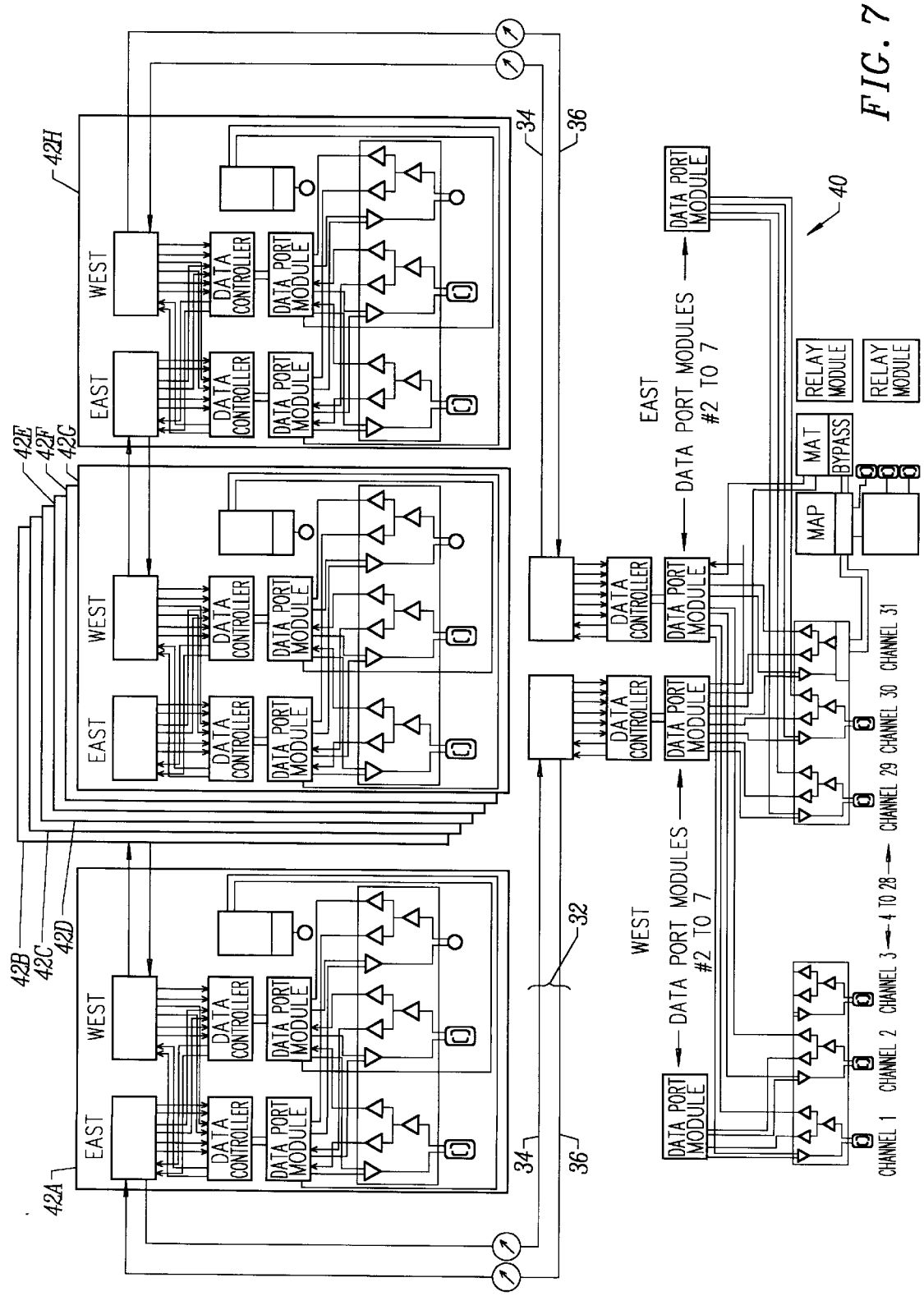
FIG. 7 illustrates a combination of a fault-tolerant master station and a set of fault-tolerant remote stations forming a fiber optic network in accordance with an embodiment of the invention.
Figure 8:
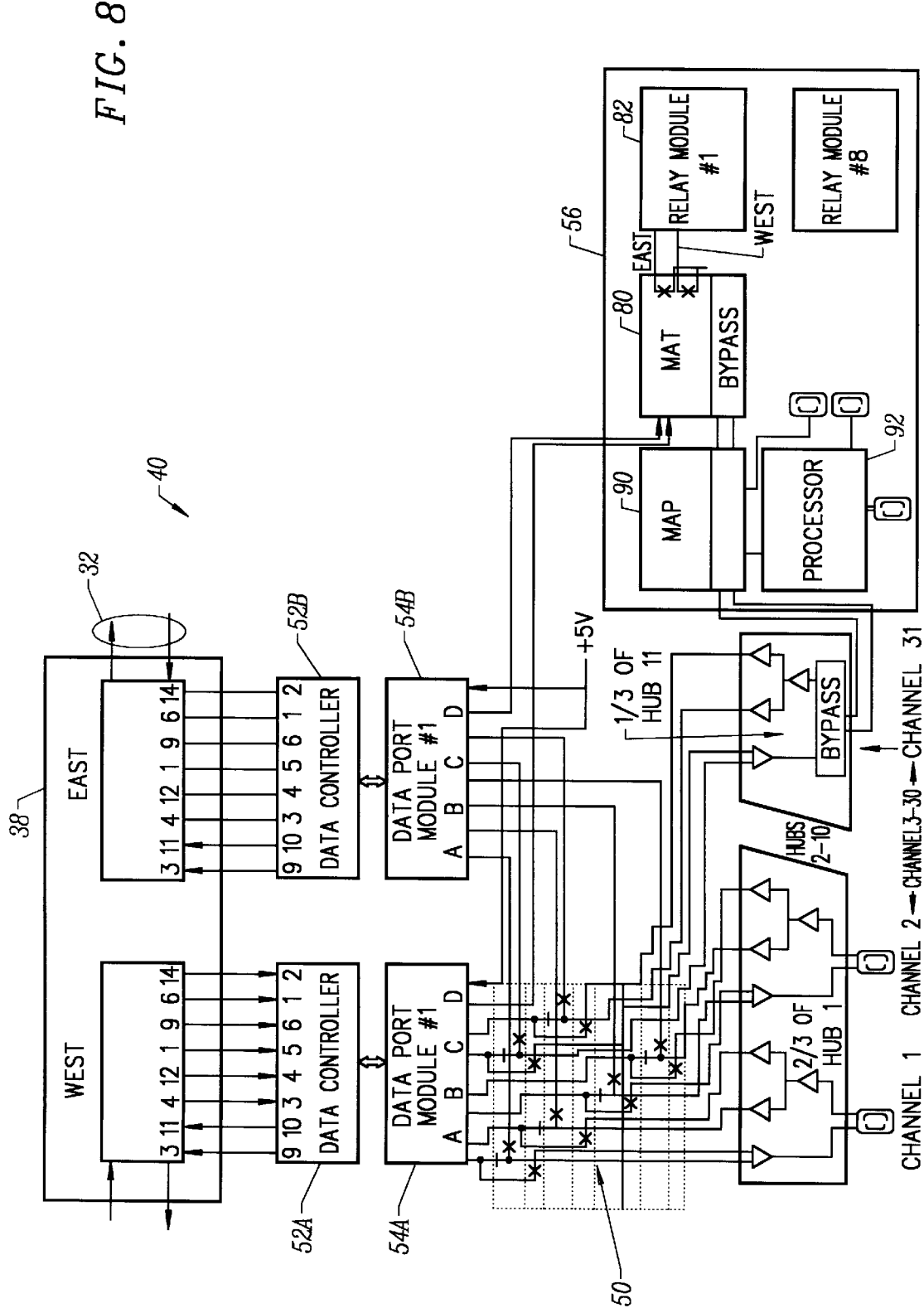
FIG. 8 illustrates a fault-tolerant master station in accordance with an embodiment of the invention.

FIG. 7 illustrates a fault-tolerant master station 40 connected to a set of fault-tolerant remote stations 42A–42H via a fiber optic transmission channel 32. FIG. 8 is an enlarged illustration of the fault-tolerant master station 40. The figure shows a fiber optic interface circuit 38. As previously indicated, fiber optic interface circuits are known in the art. The fiber optic interface circuit 38 operates to obtain the fiber optic overhead channel data and pass it to the fault-tolerant master station 40. As previously indicated, the fault-tolerant master station 40 facilitates the use of this information for private network communications. Further, the master station 40 uses this information to identify a fault on the transmission channel 32 and to take corrective action in response to the fault.

The fiber optic overhead channel data is received by one or more data controllers 52. The data controller 52 takes a synchronous serial data input from the fiber optic interface circuit 38 and generates an asynchronous signal that is passed to a data port module 54, which divides it into a set of channels. Selected channel signals are applied to a logic network 56. The logic network 56 is used to assess whether a network fault exists. If so, the logic network alters the configuration of the switch network 50, in the manner previously described. The foregoing is a general description of the operation of the fault-tolerant master station 40. Attention presently turns to a more particular discussion of an embodiment of this device.

Figure 9:
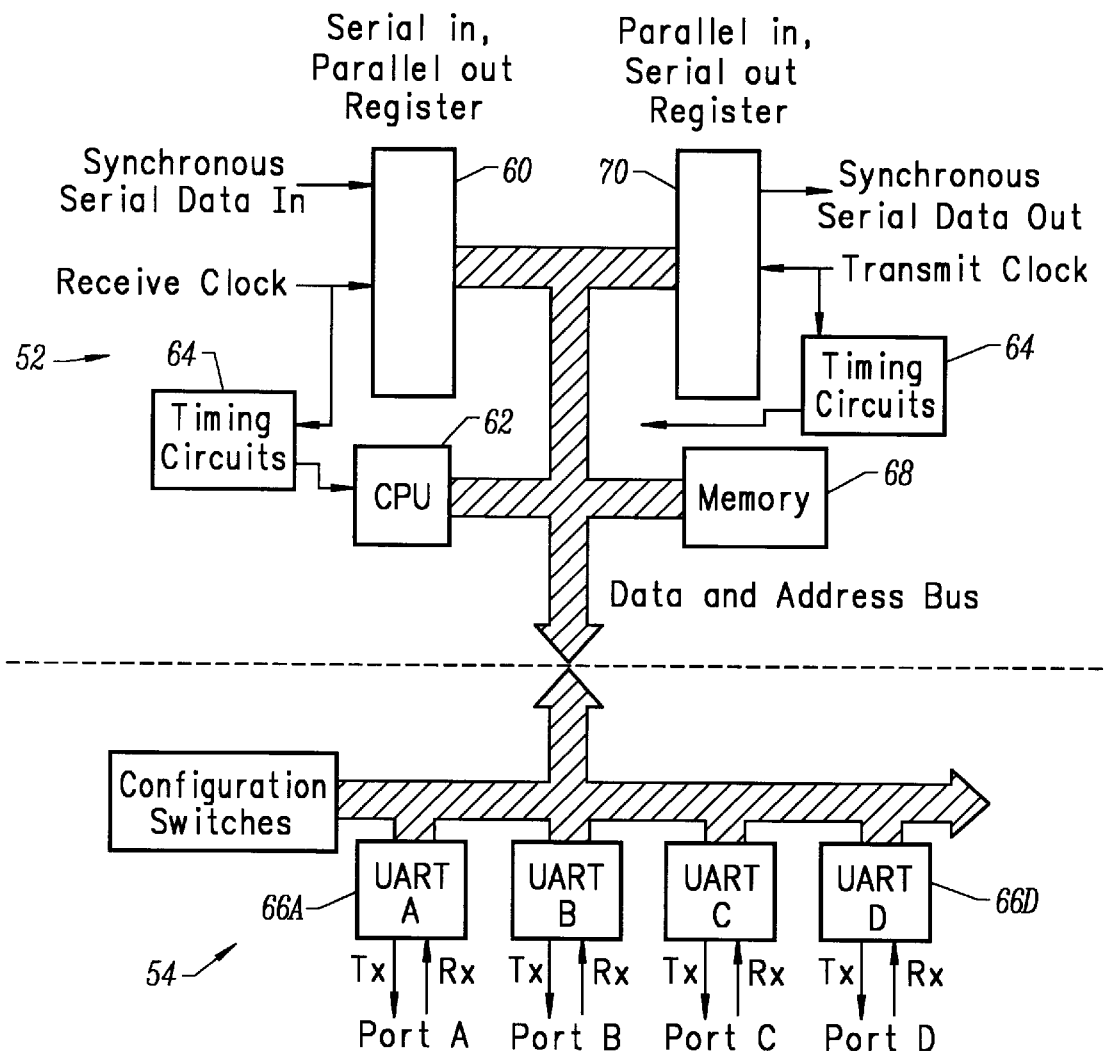
FIG. 9 illustrates a data controller and data port module for use in the fault-tolerant master station of FIG. 8.

FIG. 9 is a more detailed illustration of a data controller 52 and data port module 54 that may be used in accordance with the invention. Synchronous serial data is received from the fiber optic interface circuit 38 and is loaded into a register bank 60. A CPU 62 fetches the data from the register bank 60 and passes it as asynchronous data to the port to which it has been assigned. For the purpose of simplicity, FIG. 9 only shows four ports (Port A, Port B, Port C, and Port D), but it should be appreciated that many more ports or channels may be used. The invention has been implemented with 32 channels to handle a 64 KB fiber optic overhead channel data stream. In one configuration, 30 channels are dedicated to private network data, one channel is dedicated to an alarm signal, and one channel is a pilot channel.

Asynchronous data received at the ports 66 of the data port module 54 is converted into synchronous data. Each port converts an RS 232 or RS422 serial data signal to a TTL byte of data which is passed to a memory 68 on the data controller 52. The CPU 64 builds the data frame by sequentially loading the serial output register 70 with a framing pulse followed by the data stored in memory 68. Timing circuits 64 and firmware programming insure that each byte is placed in the correct time slot for its assigned channel. If a time slot is empty, a special null control bit is set, and all zeros are loaded in place of the normal data.

FIG. 8 illustrates that a Multi Alarm Transmitter (MAT) 80 receives a designated channel signal from the data port module 54. This signal is an alarm signal. Each fault-tolerant remote station 42 generates an alarm signal. If the MAT 80 observes that an alarm signal is missing, it can deduce that a fault has occurred. In such a case, a relay module 82 is invoked to alter the switch network 50. For example, if a fault-tolerant remote station has broken down, then it will not transmit an alarm signal and the MAT will recognize that this particular station is inoperative. Similarly, if a break in the network causes one or more fault-tolerant remote stations to be cut-off from the network, the MAT can deduce where the break is based upon the missing and received signals. Thereafter, it can take corrective switching action of the type described in reference to FIGS. 3–6. The MAT 80 has been implemented with a microprocessor and associated memory that stores a control program.

The Multi Alarm Processor (MAP) 90 is used to interrogate the coded transmitted alarm signals from the faulttolerant remote stations 42. The coded transmitted alarm signals are de-coded by the processor 92. The coded transmitted alarm signals are type-specific alarms that indicate the type of fault that has occurred at a remote station 42. Thus, the processor 92 and its associated control program can monitor the type of alarm signals being generated in the system. This information can then be used for archival purposes and/or to take corrective action.

Figure 10:
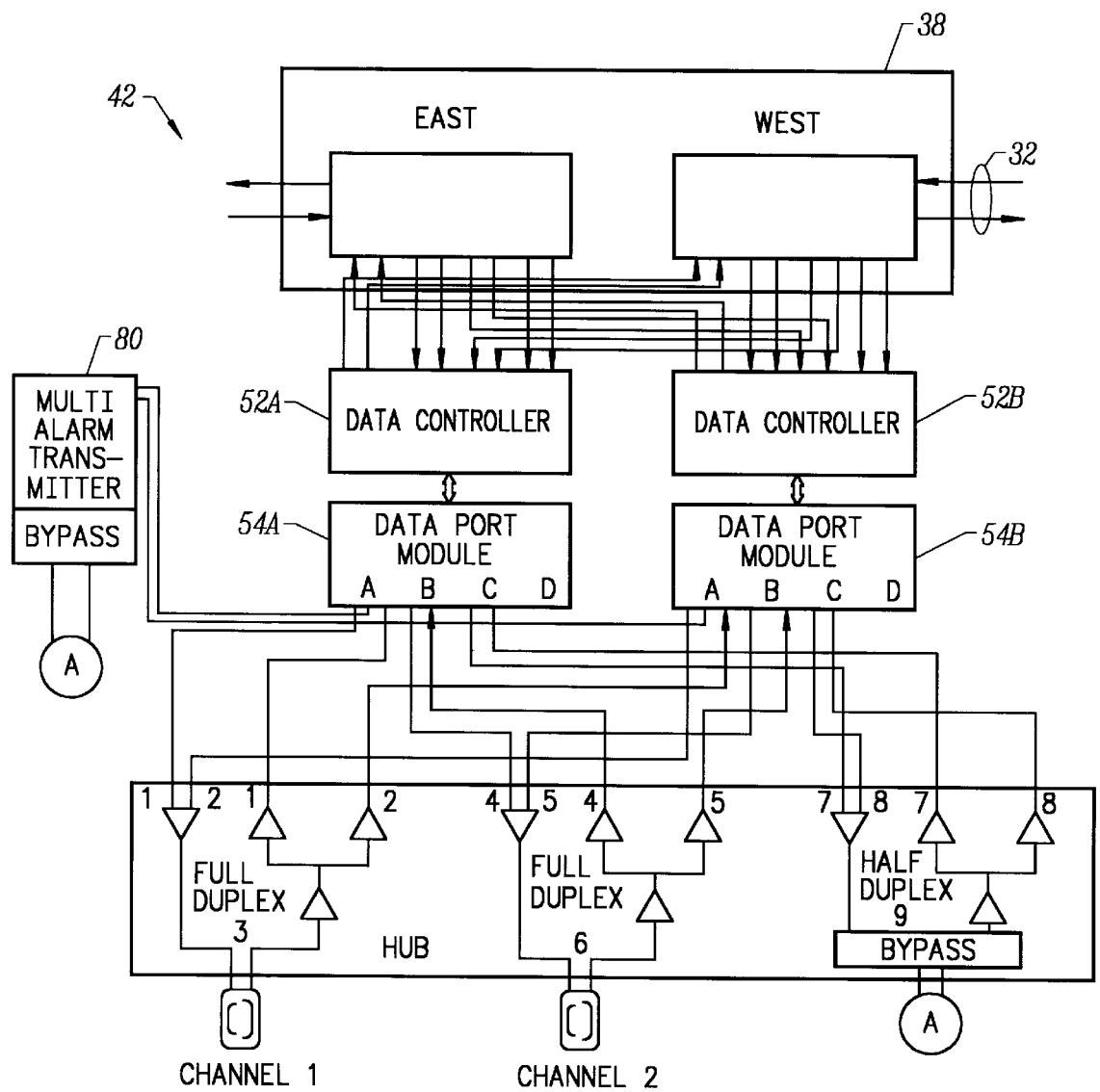
FIG. 10 illustrates a fault-tolerant remote station in accordance with an embodiment of the invention.

FIG. 10 illustrates a fault-tolerant remote station 42 in accordance with an embodiment of the invention. The remote station 42 corresponds to the master station 40 of FIG. 8, but it does not include the switch network 50 or the logic network 56. Each remote station 42 merely operates to receive and send fiber optic overhead channel data in a manner known in the art.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

I claim:

1. A fiber optic network, comprising:
   a fiber optic transmission channel with a first path and a second path;
   a plurality of fault-tolerant remote stations connected to said fiber optic transmission channel, each of said fault-tolerant remote stations being configured to send and receive fiber optic overhead channel data on both said first path and said second path; and
   a fault-tolerant master station connected to said fiber optic transmission channel, said fault-tolerant master station including a switch network and a logic network, said logic network generating first switch command signals to force said switch network into a standard configuration to transmit and receive fiber optic overhead channel data on said fiber optic transmission channel during normal operating conditions, said logic network being configured to assess said fiber optic overhead channel data to identify therefrom a fault on said fiber optic transmission channel and produce, in response to said fault, second switch command signals to force said switch network to assume a selected fault configuration such that said switch network continues to transmit and receive fiber optic overhead channel data from said fiber optic transmission channel during said fault.

2. The apparatus of claim 1 wherein said fault-tolerant master station generates said first switch command signals to force said switch network into a standard configuration wherein said fault-tolerant master station transmits said fiber optic overhead channel data to said first path and receives said fiber optic overhead channel data from said second path.

3. The apparatus of claim 1 wherein said fault-tolerant master station generates said second switch command signals to force said switch network into said selected fault configuration wherein said fault-tolerant master station transmits and receives said fiber optic overhead channel data from said first path.

4. The apparatus of claim 1 wherein said fault-tolerant master station generates said second switch command signals to force said switch network into said selected fault configuration wherein said fault-tolerant master station transmits and receives said fiber optic overhead channel data from said second path.

5. The apparatus of claim 1 wherein said fault-tolerant master station generates said second switch command signals to force said switch network into said selected fault configuration wherein said fault-tolerant master station transmits said fiber optic overhead channel data on said first path and said second path, and receives said fiber optic overhead channel data from said first path and said second path.

6. The apparatus of claim 1 further comprising a first computer attached to said fault-tolerant master station, said first computer downloading private network data which is included in said fiber optic overhead channel data transmitted by said fault-tolerant master station.

7. The apparatus of claim 6 further comprising a second computer attached to a selected fault-tolerant remote station of said plurality of fault-tolerant remote stations, said selected fault-tolerant remote station conveying said private network data of said fiber optic overhead channel data to said second computer.

8. The apparatus of claim 1 wherein each fault-tolerant remote station of said plurality of fault-tolerant remote stations generates an alarm signal which is included in said fiber optic overhead channel data.

9. The apparatus of claim 8 further comprising an alarm processing device attached to said fault-tolerant master station, said alarm processing device being configured to identify said fault.

10. The apparatus of claim 1 wherein each fault-tolerant remote station of said plurality of fault-tolerant remote stations and said fault-tolerant master station include a data port module to divide said fiber optic overhead channel data into a plurality of channel signals.

11. A fiber optic network communication device, comprising:
    a fault-tolerant master station including
       a first communication port for connection to a first path of a fiber optic transmission channel,
       a second communication port for connection to a second path of said fiber optic transmission channel,
       a switch network, and
       a logic network to generate first switch command signals to force said switch network into a standard configuration to transmit and receive fiber optic overhead channel data to said first communication port and said second communication port during normal operating conditions, said logic network being configured to assess said fiber optic overhead channel data to identify therefrom a fault on said fiber optic transmission channel and produce, in response to said fault, second switch command signals to force said switch network to assume a selected fault configuration such that said switch network continues to transmit and receive fiber optic overhead channel data from said first communication port and said second communication port during said fault.

12. The apparatus of claim 1 wherein said fault-tolerant master station generates said first switch command signals to force said switch network into a standard configuration wherein said fault-tolerant master station transmits said fiber optic overhead channel data to said first communication port and receives said fiber optic overhead channel data from said second communication port.

13. The apparatus of claim 11 wherein said fault-tolerant master station generates said second switch command signals to force said switch network into said selected fault configuration wherein said fault-tolerant master station transmits and receives said fiber optic overhead channel data from said first communication port.

14. The apparatus of claim 11 wherein said fault-tolerant master station generates said second switch command signals to force said switch network into said selected fault configuration wherein said fault-tolerant master station transmits and receives said fiber optic overhead channel data from said second communication port.

15. The apparatus of claim 11 wherein said fault-tolerant master station generates said second switch command signals to force said switch network into said selected fault configuration wherein said fault-tolerant master station transmits said fiber optic overhead channel data on said first communication port and said second communication port, and receives said fiber optic overhead channel data from said first communication port and said second communication port.

16. The apparatus of claim 11 further comprising a first computer attached to said fault-tolerant master station, said first computer downloading private network data which is included in said fiber optic overhead channel data transmitted by said fault-tolerant master station.

17. The apparatus of claim 11 wherein said fault-tolerant master station includes a data port module to divide said fiber optic overhead channel data into a plurality of channel signals.

18. A method of operating a fiber optic network, said method comprising the steps of:

sending fiber optic overhead channel data on both a first path and a second path which form a fiber optic transmission channel;

establishing at a fault-tolerant master station connected to said fiber optic transmission channel a first switch configuration to receive said fiber optic overhead channel data;

identifying from said fiber optic overhead channel data a fault on said fiber optic transmission channel; and forming a second switch configuration at said fault-tolerant master station to receive said fiber optic overhead channel data.

19. The method of claim 18 wherein said sending step includes the step of sending fiber optic overhead channel data including private network data and alarm signals.

20. The method of claim 19 further comprising the step of reading said private network data at a fault-tolerant remote station connected to said fiber optic transmission channel.

* * * * *